(12) United States Patent
Burkhart et al.

(10) Patent No.: US 6,730,749 B1
(45) Date of Patent: *May 4, 2004

(54) SILOXANE BLOCK COPOLYMERS HAVING LINKED SILOXANE BLOCKS

(75) Inventors: Georg Burkhart, Essen (DE); Rolf-Dieter Langenhagen, Hattingen (DE); Andreas Weier, Essen (DE)

(73) Assignee: Goldschmidt AG, Essen (DE)

( * ) Notice: Subject to any disclaimer, the term of this patent is extended or adjusted under 35 U.S.C. 154(b) by 432 days.

This patent is subject to a terminal disclaimer.

(21) Appl. No.: 09/548,294

(22) Filed: Apr. 12, 2000

Related U.S. Application Data

(63) Continuation of application No. 08/869,555, filed on Jun. 5, 1997, now abandoned.

(30) Foreign Application Priority Data

Mar. 29, 1997 (DE) .......................................... 197 13 278

(51) Int. Cl.⁷ .............................................. C08L 83/12
(52) U.S. Cl. ........................ 525/474; 556/444; 556/445; 528/27; 528/35
(58) Field of Search .................................. 556/444, 445; 528/27, 35; 525/474

(56) References Cited

U.S. PATENT DOCUMENTS

| | | | |
|---|---|---|---|
| 3,234,252 A | 2/1966 | Pater | |
| 3,952,038 A | 4/1976 | Prokai | |
| 4,047,958 A | * 9/1977 | Yoneyama et al. | 96/87 R |
| 5,136,068 A | * 8/1992 | Bahr et al. | 556/445 |
| 5,274,156 A | * 12/1993 | LeGrow et al. | 556/445 |
| 5,306,737 A | * 4/1994 | Burkhart et al. | 521/112 |
| 5,844,010 A | 12/1998 | Burkhart et al. | |
| 5,889,108 A | * 3/1999 | Zhang | 524/862 |
| 6,414,175 B1 | 7/2002 | Burkhart et al. | |

FOREIGN PATENT DOCUMENTS

| | | |
|---|---|---|
| DE | 1 570 647 | 2/1971 |
| DE | 1 694 366 | 6/1971 |
| DE | 2 402 690 | 9/1974 |
| DE | 25 41 865 | 4/1976 |
| DE | 25 33 074 | 10/1979 |
| DE | 3436177 | 4/1986 |
| DE | 36 26 297 | 7/1987 |
| DE | 42 29 402 | 3/1994 |
| EP | 0 275 563 | 7/1988 |
| EP | 0 529 847 | 3/1992 |
| EP | 0 381 318 | 8/1996 |

* cited by examiner

Primary Examiner—Caixia Lu
(74) Attorney, Agent, or Firm—Frommer Lawrence & Haug LLP

(57) ABSTRACT

The invention relates to novel siloxane block copolymers of the general average formula

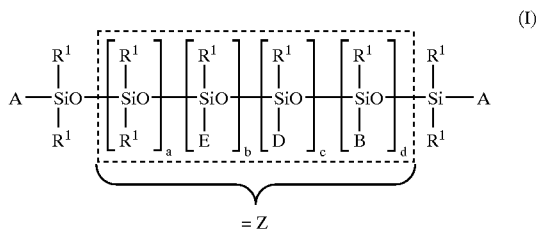

(I)

having linked, different siloxane blocks and their use as surface-active agents, in particular as additives in the preparation of polyurethane foams.

20 Claims, No Drawings

SILOXANE BLOCK COPOLYMERS HAVING LINKED SILOXANE BLOCKS

This is a continuation of application Ser. No. 08/869,555, filed Jun. 5, 1997, now abandoned.

The invention relates to novel siloxane block copolymers having linked, different siloxane blocks and the use thereof.

According to the prior art, there is a large number of surface-active siloxane block copolymers which are used in a wide range of industrial applications. These may be methylpolysiloxanes (cf. DE-C-25 33 074) as well as (pseudo)haloalkyl-substituted siloxanes (cf. DE-C-36 26 297, U.S. Pat. No. 3,952,038 or DE-A-24 02 690), which, for example, are used as cell regulators in highly resilient, cold-curing polyurethane foams. A wide range of silicone-polyether copolymers and their use as surface-active substances are also known, as described, for example, in the following patents by way of example:

DE-C-15 70 647: Chloropolysiloxanyl sulfates are reacted with mixtures of alkylene adducts which consist of from 50 to 96 OH-equivalent percent of polyalkylene glycol monoethers which consist of ethylene oxide and propylene oxide units and contain from 40 to 70% by weight oxypropylene units and have a molecular weight of from 1000 to 3000, whose hydroxyl groups are preferably secondary, and from 5 to 50 OH-equivalent percent of alkylene oxide adducts of polyvalent hydroxyl compounds having a molecular weight of from 130 to 3500, whose polyalkylene glycol components consist of ethylene oxide and/or propylene oxide units and have an OH equivalent weight of up to 1750 and whose hydroxyl groups are preferably secondary, the ratios being chosen so that not more than 1.4, preferably from 1.05 to 1.2, OH equivalents are present per acid equivalent of the chloropolysiloxanyl sulfate.

DE-C-16 94 366: Polysiloxane-polyoxyalkylene block copolymers whose polysiloxane block has a composition known per se but whose polyalkylene block consists of from 25 to 70% by weight of a polyoxyalkylene having an average molecular weight of from 1600 to 4000 and an ethylene oxide content of from 20 to 100% by weight, the remainder being propylene oxide and optionally higher alkylene oxides, and from 30 to 75% by weight of a polyoxyalkylene having an average molecular weight of from 400 to 1200 and an ethylene oxide content of from 65 to 100% by weight, the remainder being propylene oxide and optionally higher alkylene oxides, are used as foam stabilizers.

DE-A-25 41 865: The polysiloxane-polyoxyalkylene block copolymers are defined, with respect to their polyoxyalkylene blocks, in such a way that one polyoxyalkylene block has an average molecular weight of from 900 to 1300 and comprises from 30 to 55% by weight of ethylene oxide, the remainder being propylene oxide, and the other polyoxyalkylene block has an average molecular weight of from 3800 to 5003 and comprises from 30 to 50% by weight of ethylene oxide, the remainder being propylene oxide.

EP-A-0 275 563: The block copolymer described in this patent application comprises three different polyoxyalkylene blocks, namely a block which contains from 20 to 60% by weight of oxyethylene units, with a molecular weight of from 3000 to 5000, a further block having from 20 to 60% by weight of oxyethylene units and a molecular weight of from 800 to 2900 and a third block comprising only polyoxypropylene units and having a molecular weight of from 130 to 1200.

The patent literature furthermore describes siloxane block E-E -copolymers which are used as emulsifiers and in which both polyoxyalkylene groups and long-chain alkyl groups are bonded to linear polysiloxanes (cf. for example U.S. Pat. No. 3,234,252, U.S. Pat. No. 4,047,958 or DE-C-34 36 177).

Further patents (e.g. U.S. Pat. No. 5,136,068, EP-A-0 381 318 and EP-A-0 529 847) describe surface-active siloxane block copolymers for use as emulsifiers, in which polyoxyalkylene radicals and long-chain alkyl radicals are bonded to the polysiloxane and an additional linkage of the siloxane block copolymer via a divalent organic radical is present. The feature of the siloxane block copolymers described is that in all cases identical siloxane blocks are linked to one another by reaction of SiH groups with, for example, diolefins, divinylbenzene or 1,3-divinyltetramethyldisiloxane.

In spite of the large number of siloxane block copolymers thus obtainable, the large number of fields of use for these active substances, for example as additives for solvent-containing and also low-solvent finishes, surface coatings and pastes, for coating textiles and paper (tissues), as starting materials for crosslinking reactions, as antifoams, as emulsifiers, as additives in cosmetic formulations, as stabilizers for the wide field of PU foam production (on the one hand, a large number of possible polyurethane foam types, such as, for example, flexible foam, rigid foam, ester foam, cold-curing foam, packaging foam, flame-laminatable foam, molding foam, integral foam, etc., and, on the other hand, more modern foaming techniques, such as variable pressure foaming, foaming with inert gases under pressure or forced cooling processes, for example ENVIRO—CURE, from CRAIN INDUSTRIES), makes it necessary to find structures which are further improved.

Surprisingly, it has now been found that the linkage of different siloxane blocks in one molecule has surprising effects in various application tests. According to the teaching of the present invention, different siloxane copolymer blocks (different based on the modifying radicals on the siloxane and/or the structure of the siloxane segment) can be linked to one another in a simple manner via coupling agents, and novel siloxane block copolymers in which the linked siloxane copolymer blocks differ, for example, in their polarities, in their hydrophilic/hydrophobic balance or in proportions of reactive groups can thus be synthesized in a controlled manner.

The present invention thus relates to siloxane block copolymers of the general average formula:

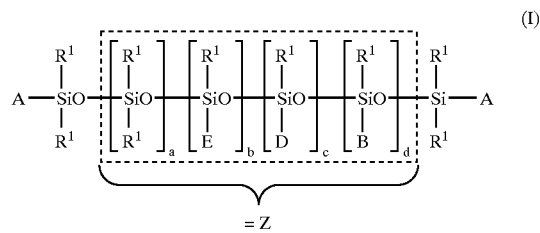

where the radicals and indices have the following meaning:

A=radical $R^1$, radical E or a radical of the formula IIa

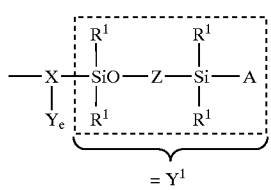

(IIa)

or a radical of the formula IIb

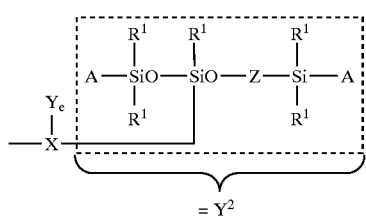

(IIb)

B=radical of the formula IIa or IIb
Y=radical $Y^1$ or radical $Y^2$,
D=radical of the formula

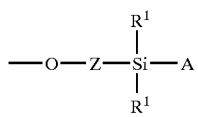

$R^1$=an alkyl radical having 1 to 30 carbon atoms, a substituted alkyl radical, an optionally substituted aryl radical or an optionally substituted alkaryl radical, where however at least 80% of the radicals $R^1$ are methyl groups,
a has a value from 3 to 200,
b has a value from 0 to 50,
c has a value from 0 to 10,
d has a value from 0 to 5 and
e has a value from 0 to 4,
where the values for a, b, c, d and e in the individual segments Z of the radicals A, B and D may be different,
E=radical which
  a) is a radical of the general formula

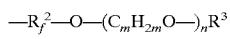

in which
    $R^2$ is a divalent alkyl radical which may also be branched and
    f has a value of 0 or 1,
    m has a value of, on average, from 2 to 4,
    n has a value from 0 to 100 and
    $R^3$ is a hydrogen radical, an optionally substituted alkyl radical having 1 to 6 carbon atoms, an acyl radical or a —O—CO—NH—$R^4$ radical in which $R^4$ is an optionally substituted alkyl or aryl radical, and/or
  b) has the meaning of an epoxy-functionalized alkyl substituent optionally containing hetero atoms, and/or
  c) has the meaning of a mono-, di- and trihydroxyalkyl substituent which may also be aromatic or branched and partially or completely etherified or esterified, and/or
  d) has the meaning of a halogen- or pseudohalogen-substituted alkyl, aryl or aralkyl radical which optionally may also be branched, X=a polyvalent organic radical, with the proviso that at least one radical of the formula IIa or IIb is present in the molecule and at least two of the segments Z are different.

It is also possible to use different substituents in combination, as described, for example, for polyether substituents in DE-C-42 29 402. The substituents may optionally differ from one another, for example in their molar mass, in the case of polyethers possibly in their terminal group $R^3$ or the proportions of the monomers used, in the type of monomers, etc.

X is a polyvalent organic radical (valency=2+e). The radical X is formed by reacting compounds which contain 2+e hydrosilylable olefinic double bonds per molecule with SiH groups. At least one radical X must be present per molecule of compounds according to the invention. The molecule obtained by linkage should contain ≦600 Si atoms.

It is clear to a person skilled in the art that the compounds obtained are present in the form of a mixture whose distribution is determined essentially by statistical laws. The values for a, b, c, d and n and the number of X radicals per molecule therefore correspond to average values.

A small proportion of the radicals $R^1$ may be a hydrogen radical, namely when the hydrogensiloxane used does not react completely with the olefinically unsaturated compounds used (e.g. allylpolyethers, α-olefins, allyl glycidyl ethers, etc.) and the organic compounds which form the bridging member X.

X may be, for example, a bridging radical of the formula

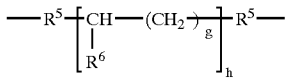

in which
$R^5$ is a divalent alkyl radical which may also be branched and
$R^6$ is a hydrogen radical, an optionally branched alkyl radical or the radical $R^5$ and
g has a value from 0 to 5 and
h has a value from 0 to 4,
or of the formula

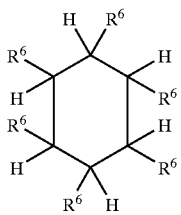

in which $R^6$ has the same meaning as above,
or of the formula

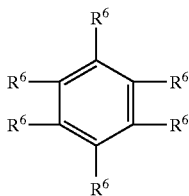

in which $R^6$ has the same meaning as above,
or of the formula

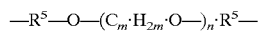

in which
R⁵ has the same meaning as above,
m' has a value of, on average, from 2 to 4 and
n' has a value from 0 to 20,
or of the formula $$-R^5-(CO-)_k OCH_2-(CR_2^7-)_i CH_2 O-(CO-)_k R^5-$$

in which
R⁵ has the same meaning as above and
R⁷ is a hydrogen radical, an alkyl radical, a hydroxyalkyl radical or the radical —CH₂O—(CO—)ₖR⁵— and
i has a value from 0 to 10 and
k has a value of 0 or 1,
or of the formula

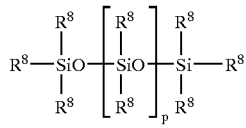

in which
R⁸ is an alkyl radical, a substituted alkyl radical, a phenyl radical or the radical R⁵ and
p has a value from 0 to 10, the value of 0 being preferred, and
if it has the meaning of an alkyl radical, the radical R⁸ is preferably an alkyl radical having 1 to 6 carbon atoms, particularly preferably a methyl radical,
or of the formula $$-R^5-NH-CO-NH-R^5-$$

in which
R⁵ has the same meaning as above.

The sum of the R⁵ radicals per X radical must be 2+e. Preferably, R⁵ is the radical —(CH₂)₂— or —(CH₂)₃—.

Examples of substances with which the radical X can be formed are 1,7-octadiene, trimethylolpropane diallyl ether, trimethylolpropane triallyl ether, pentaerythritol triallyl ether, divinylbenzene, divinylcylcohexane, 1,4-butanediol divinyl ether, diallyl polyether, diallylurea and 1,3-divinyltetramethyldisiloxane.

The essential feature of the invention is that, in the average molecule, at least two different siloxane block copolymers are linked to one another. This means that Z in the formula I must differ from that in the formula IIa and/or IIb. This is explained in more detail with reference to the following, schematic formulae:

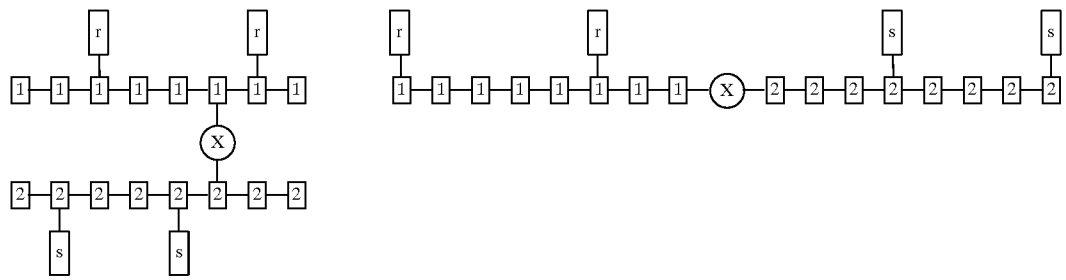

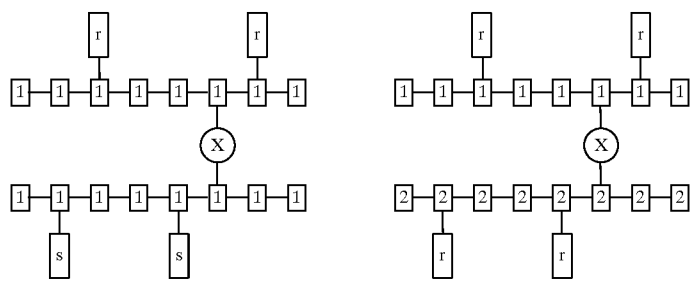

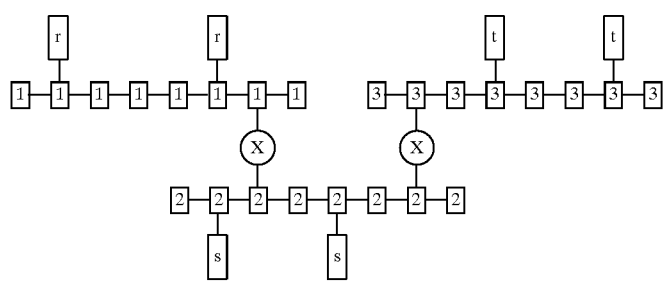

-continued

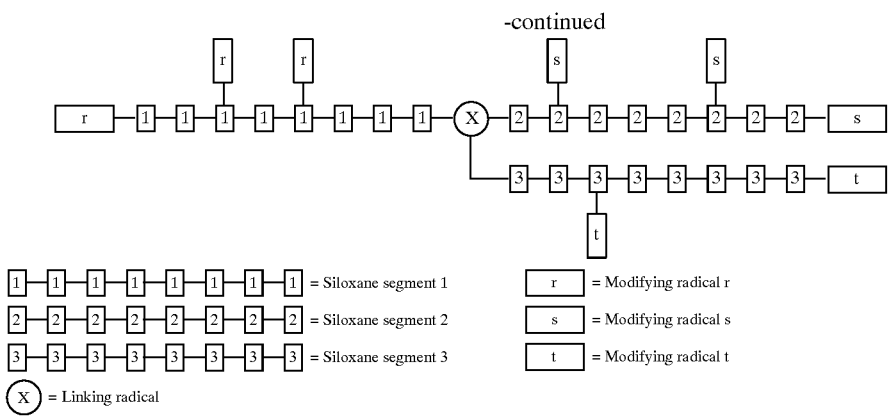

The modifying radicals r, s and t have the meaning of the radicals $R^1$ and E. The character of the invention is that either the modifying radical r differs from at least one of the modifying radicals s or t or that the siloxane segment 1 differs from at least one of the other siloxane segments used. Some combinations for the modifying radical r and s, which should be regarded as exemplary, but not limiting, for the scope of the invention, are shown below.

| Modifying radical r | Modifying radical s |
|---|---|
| PO-rich polyether radical | EO-rich polyether radical |
| High molecular weight polyether radical | Low molecular weight polyether radical |
| OH-terminated polyether radical | $CH_3$-terminated polyether radical |
| Polyether radical | Alkyl radical |
| Long-chain alkyl radical | Short-chain alkyl radical |
| Polyether radical | Glycidyloxypropyl radical |
| Alkyl radical | Glycidyloxypropyl radical |
| Polyether radical | Hydroxyalkyl radical |
| Alkyl radical | Hydroxyalkyl radical |
| Polyether radical | Hydroxyalkoxyalkyl radical |
| Alkyl radical | Hydroxyalkoxyalkyl radical |
| Polyether radical | Phenyl radical |
| Alkyl radical | Phenyl radical |
| Polyether radical | 3-(4'-Hydroxy-3'-methoxy-phenyl) propyl radical |
| Alkyl radical | 3-(4'-Hydroxy-3'-methoxy-phenyl) propyl radical |
| Polyether radical | Phenylethyl radical |
| Alkyl radical | Phenylethyl radical |
| Polyether radical | Norbornyl radical |

Products in which the modifying radical still contains reactive groups, such as, for example, OH or epoxy groups, are suitable on the one hand for the treatment of surfaces (e.g. fiber preparation, finish additives, etc.) and, on the other hand, for further chemical reactions. Thus, the OH-containing siloxane block copolymers according to the invention can be esterified with methacrylic acid. For example, quats and betaines can be prepared by known processes from the siloxane block copolymers containing epoxy groups.

The respective modifying radical need not be uniform; for example, the modifying radical r may consist of a combination of the radicals $r^1$, $r^2$, $r^3$, etc., which likewise have the meaning of the radicals $R^1$ and E, if it is ensured that either at least one of the modifying radicals further used (s, etc.) has another composition or that at least two different siloxane segments are present.

In general, those compounds which differ by more than 20% in the average number of Si atoms in the individual, linked siloxane blocks or in which the masses of the modifying radicals r, s or t in the individual siloxane segments differ by more than 20% are preferred.

Depending on the desired field of use, various ranges are preferred from the group of compounds claimed:

For applications in the preparation of flexible polyurethane block foams, for example, compounds with b>3 and 5<(a+c+d)/b<20 are preferred. However, products having an average m in the molecule of 2.3<m<3.1 are particularly preferred and those having an average m in the molecule of 2.5<m<2.8 are very particularly preferred.

For use in the preparation of rigid polyurethane foam or polyurethane ester foam, compounds having an average n in the molecule of n<28 are preferred, and compounds having an average m in the molecule of m<2.5 are particularly preferred. Compounds having an average quotient (a+c+d)/b in the molecule of (a+c+d)/b<8 are very particularly preferred.

For applications in the preparation of cold-curing molding foams, compounds having an average b in the molecule of b<5 are preferred, and compounds having a total number of radicals E<7 are particularly preferred.

For applications in cosmetics or as an emulsifier, compounds in which at least 60% of the radicals $R^3$ are hydrogen radicals or those which contain aromatic substituents in at least one of the modifying radicals used are preferred. Compounds in which at least 80% of the radicals $R^3$ are hydrogen radicals are particularly preferred, and compounds in which all radicals $R^3$ are hydrogen radicals and the average value of m in the molecule is less than 2.3 are very particularly preferred.

For applications as an additive in the field of finishes and surface coatings, those compounds in which at least 80% of the radicals $R^3$ are hydrogen radicals are preferred; and those in which the radical E has the meaning of an epoxy-functionalized alkyl substituent are particularly preferred.

The preparation of siloxane block copolymers according to the invention is described by way of example below. The reactions can also be carried out in solvents especially when highly viscous products are formed.

Preparation of Block Copolymer 1

96.5 g (0.0200 mol) of siloxane having the following average composition $(CH_3)_3SiO-[(CH_3)_2SiO-]_{58}[(CH_3)HSiO-]_6Si(CH_3)_3$, 14.7 g (0.0100 mol) of siloxane having the following average composition $H(CH_3)_2SiO-[(CH_3)_2SiO-]_{18}Si(CH_3)_2H$, 7.5 g (0.0125 mol) of polyether having the following average composition $CH_2=CH-CH_2O-(C_2H_4O-)_{12}CH_3$,
56.6 g (0.0375 mol) of polyether having the following average composition
$CH_2=CH-CH_2O(C_2H_4O-)_5(C_3H_6O-)_{21}CH_3$,
301.8 g (0.0750 mol) of polyether having the following average composition
$CH_2=CH-CH_2O-(C_2H_4O-)_{45}(C_3H_6O-)_{34}CH_3$ and
4.3 g (0.0200 mol) of trimethylolpropane diallyl ether are initially taken in a flask provided with a stirrer, a thermometer, a gas inlet and a reflux condenser. Nitrogen is passed through the apparatus, and the flask content is heated to 105° C. with thorough stirring. 0.5 g of a 10% strength solution of $H_2ptCl_6.6H_2O$ in isopropanol is then added to the batch. A slightly exothermic reaction begins. The batch is allowed to react. In the course of the reaction, the batch becomes clear. After 3.5 hours, the SiH conversion is 97.7% (determined by means of hydrogen elimination with n-butanol in an alkaline medium). A clear, yellow product is obtained. The block copolymer 1 obtained has the following average composition:

271.6 g (0.0675 mol) of polyether having the following average composition
$CH_2=CH-CH_2O-(C_2H_4-)_{45}(C_3H_6O-)_{34}CH_3$ and
1.9 g (0.0100 mol) of 1,3-divinyltetramethyldisiloxane are initially taken in a flask provided with a stirrer, a thermometer, a gas inlet and a reflux condenser. Nitrogen is passed through the apparatus, and the flask content is heated to 105° C. with thorough stirring. 0.45 g of a 10% strength solution of $H_2PtCl_6.6H_2O$ in isopropanol is then added to the batch. A slightly exothermic reaction begins. The batch is allowed to react. In the course of the reaction, the batch becomes clear. After 3 hours, the SiH conversion is 97.5% (determined by means of hydrogen elimination with n-butanol in an alkaline medium). A clear, yellow product is obtained. The block copolymer 2 obtained has the following average composition:

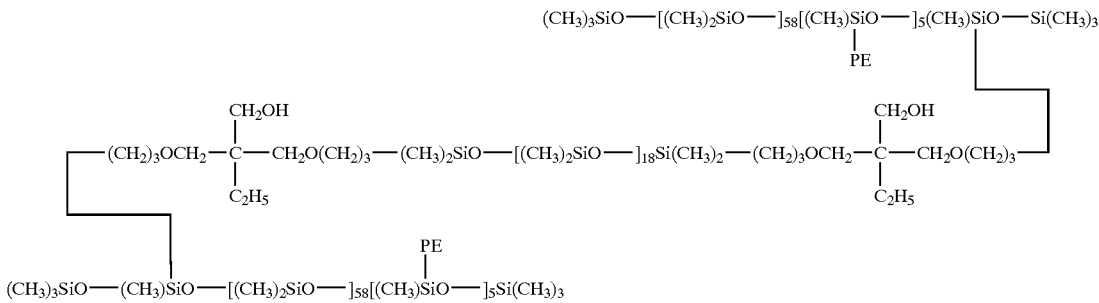

The radical PE comprises 10% of the radical $-(CH_2)_3O-(C_2H_4O-)_{12}CH_3$
and 30% of the radical $-(CH_2)_3O-(C_2H_4O-)_5(C_3H_6O-)_{21}CH_3$
and 60% of the radical $-(CH_2)_3O-(C_2H_4O-)_{45}(C_3H_6O-)_{34}CH_3$.

Preparation of Block Copolymer 2

48.2 g (0.0100 mol) of siloxane having the following average composition

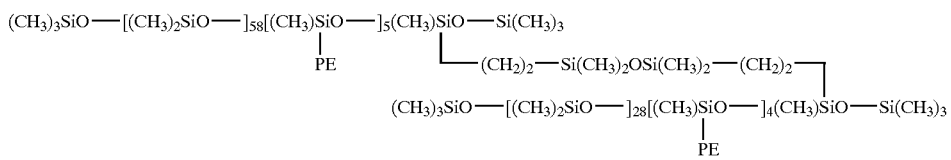

The radical PE comprises 10% of the radical $-(CH_2)_3O-(C_2H_4O-)_{12}CH_3$
and 30% of the radical $-(CH_2)_3O-(C_2H_4O-)_5(C_3H_6O-)_{21}CH_3$
and 60% of the radical $-(CH_2)_3O-(C_2H_4O-)_{45}(C_3H_6O-)_{34}CH_3$.

$(CH_3)_3SiO-[(CH_3)_2SiO-]_{58}[(CH_3)HSiO-]_6Si(CH_3)_3$,
25.4 g (0.0100 mol) of siloxane having the following average composition
$(CH_3)_3SiO-[(CH_3)_2SiO-]_{28}[(CH_3)HSiO-]_5Si(CH_3)_3$,
6.8 g (0.0113 mol) of polyether having the following average composition
$CH_2=CH-CH_2O-(C_2H_4O-)_{12}CH_3$,
51.0 g (0.0338 mol) of polyether having the following average composition
$CH_2=CH-CH_2O-(C_2H_4O-)_5(C_3H_6O-)_{21}CH_3$, Preparation of Block Copolymer 3

48.2 g (0.0100 mol) of siloxane having the following average composition
$(CH_3)_3SiO-[(CH_3)_2SiO-]_{58}[(CH_3)HSiO-]_6Si(CH_3)_3$,
50.8 g (0.0200 mol) of siloxane having the following average composition
$(CH_3)_3SiO-[(CH_3)_2SiO-]_{28}[(CH_3)HSiO-]_5Si(CH_3)_3$,
22.1 g (0.0150 mol) of polyether having the following average composition
$CH_2=CH-CH_2O-(C_2H_4O-)_{16}(C_3H_6O-)_{12}CH_3$, 124.6 g (0.0825 mol) of polyether having the following average composition $CH_2=CH—CH_2O—(C_2H_4O—)_5(C_3H_6O—)_{21}CH_3$, 60.4 g (0.0150 mol) of polyether having the following average composition $CH_2=CH—CH_2O—(C_2H_4O—)_{45}(C_3H_6O—)_{34}CH_3$, 150.4 g (0.0375 mol) of polyether having the following average composition $CH_2=CH—CH_2O—(C_2H_4O—)_{45}(C_3H_6O—)_{34}H$ and 2.2 g (0.0200 mol) of 1,7-octadiene are initially taken in a flask provided with a stirrer, a thermometer, a gas inlet and a reflux condenser. Nitrogen is passed through the apparatus, and the flask content is heated to 105° C. with thorough stirring. 0.5 g of a 10% strength solution of $H_2PtCl_6.6H_2O$ in isopropanol is then added to the batch. A slightly exothermic reaction begins. The batch is allowed to react. In the course of the reaction, the batch becomes clear. After 6 hours, the SiH conversion is 98.5% (determined by means of hydrogen elimination with n-butanol in an alkaline medium). A clear, yellow product is obtained. The Block Copolymer 3 obtained has the following average composition:

$(CH_3)_3SiO—[(CH_3)_2SiO—]_{28}[(CH_3)SiO—]_4(CH_3)SiO—Si(CH_3)_3$
                                    |
                                    PE                    └—$(CH_2)_8$—┐

$(CH_3)_3SiO—(CH_3)SiO—[(CH_3)_2SiO—]_{58}[(CH_3)SiO—]_4(CH_3)SiO—Si(CH_3)_3$
             └—$(CH_2)_8$—┐                    |
                                                PE $(CH_3)_3SiO—(CH_3)SiO—[(CH_3)_2SiO—]_{28}[(CH_3)SiO—]_4Si(CH_3)_3$
                                                       |
                                                       PE

The radical PE comprises 10% of the radical ——$(CH_2)_3O—(C_2H_4O—)_{16}(C_3H_6O—)_{12}CH_3$
and 55% of the radical ——$(CH_2)_3O—(C_2H_4O—)_5(C_3H_6O—)_{21}CH_3$
and 10% of the radical ——$(CH_2)_3O—(C_2H_4O—)_{45}(C_3H_6O—)_{34}CH_3$.
and 25% of the radical ——$(CH_2)_3O—(C_2H_4O—)_{45}(C_3H_6O—)_{34}H$ Preparation of Block Copolymer 4

96.5 g (0.0200 mol) of siloxane having the following average composition $(CH_3)_3SiO—[(CH_3)_2SiO—]_{58}[(CH_3)HSiO—]_6Si(CH_3)_3$, 35.8 g (0.0100 mol) of siloxane having the following average composition $H(CH_3)_2SiO—[(CH_3)_2SiO—]_{32}[(CH_3)RSiO—]_6Si(CH_3)_2H$, $R=—CH_2—CH(CH_3)—C_6H_5$ (obtainable, for example, by equilibration of a mixture of 1,1,3,3-tetramethyl-disiloxane, octamethylcyclotetra-siloxane and cyclic siloxane of the formula $[(CH_3)Si(CH_2CH(CH_3)C_6H_5)O—]_4$ with trifluoromethanesulfonic acid), 7.5 g (0.0125 mol) of polyether having the following average composition $CH_2=CH—CH_2O—(C_2H_4O—)_{12}CH_3$, 56.6 g (0.0375 mol) of polyether having the following average composition $CH_2=CH—CH_2O—(C_2H_4O—)_5(C_3H_6O—)_{21}CH_3$, 301.8 g (0.0750 mol) of polyether having the following average composition $CH_2=CH—CH_2O—(C_2H_4O—)_{45}(C_3H_6C—)_{34}OH_3$, 4.3 g (0.0200 mol) of trimethylolpropane diallyl ether and 300 ml of toluene are initially taken in a flask provided with a stirrer, a thermometer, a gas inlet and a reflux condenser. Nitrogen is passed through the apparatus, and the flask content is heated to 90° C. while stirring. 0.55 g of a 10% strength solution of $H_2PtCl_6.6H_2O$ in isopropanol is then added to the batch. A slightly exothermic reaction begins. The batch is allowed to react. In the course of the reaction, the batch becomes clear. After 10 hours, the SiH conversion is 98.2% (determined by means of hydrogen elimination with n-butanol in an alkaline medium). The passage of nitrogen is then terminated and the reflux condenser is replaced by a distillation attachment. Volatile components are distilled off at a temperature of 80° C. and a vacuum of about 20 mbar. A clear, yellow product remains behind. The block copolymer 4 obtained has the following average composition:

$(CH3)3SiO—[(CH_3)_2SiO—]_{58}[(CH_3)SiO—]_5(CH_3)SiO—Si(CH_3)_3$
                                      |
                                      PE

CH$_2$OH                                                                    CH$_2$OH
          |                                                                            |
—$(CH_2)_3OCH_3$—C—$CH_2O(CH_2)_3$—$(CH_3)_2SiO$—$[(CH_3)_2SiO—]_{32}[(CH_3)SiO—]_6Si(CH_3)_2$—$(CH_2)_3OCH_2$—C—$CH_2O(CH_2)_3$—
          |                                                                            |
         C$_2$H$_5$                                                                   C$_2$H$_5$
                                                      PE
                                                      |
            $(CH_3)_3SiO—(CH_3)SiO—[(CH_3)_2SiO—]_{58}[(CH_3)SiO—]_5Si(CH_3)_3$

The radical PE comprises 10% of the radical ——$(CH_2)_3O—(C_2H_4O—)_{12}CH_3$
and 30% of the radical ——$(CH_2)_3O—C_2H_4O—)_5(C_3H_6O—)_{21}CH_3$
and 60% of the radical ——$(CH_2)_3O—C_2H_4O—)_{45}(C_3H_6O—)_{34}CH_3$——

Preparation of Block Copolymer 5

48.2 g (0.0100 mol) of siloxane having the following average composition $(CH_3)_3SiO—[(CH_3)_2SiO—]_{58}[(CH_3)HSiO—]_6Si(CH_3)_3$, 50.8 g (0.0200 mol) of siloxane having the following average composition $H(CH_3)_2SiO—[(CH_3)_2SiO—]_{30}[(CH_3)HSiO—]_3Si(CH_3)_2H$, 9.8 g (0.0163 mol) of polyether having the following average composition $CH_2=CH—CH_2O—(C_2H_4O—)_{12}CH_3$, 73.6 g (0.0488 mol) of polyether having the following average composition $CH_2=CH—CH_2O—(C_2H_4O—)_5(C_3H_6O—)_{21}CH_3$, 392.3 g (0.0975 mol) of polyether having the following average composition $CH_2=CH—CH_2O—(C_2H_4O—)_{45}(C_3H_6O—)_{34}CH_3$, 2.6 g (0.0100 mol) of pentaerythrityl triallyl ether and
385 g of Solvesso 150 are initially taken in a flask provided with a stirrer, a thermometer, a gas inlet and a reflux condenser. Nitrogen is passed through the apparatus, and the flask content is heated to 105° C. while stirring. 0.6 g of a 10% strength solution of $H_2PtCl_6.6H_2O$ in isopropanol is then added to the batch. A slightly exothermic reaction begins. The batch is allowed to react. In the course of the reaction, the batch becomes clear. After 3 hours, the SiH conversion is 100% (determined by means of hydrogen elimination with n-butanol in an alkaline medium). A clear, yellow solution of the desired block copolymer in Solvesso 150 is obtained. The block copolymer 5 obtained has the following average composition:

Preparation of Block Copolymer 6

48.2 g (0.0100 mol) of siloxane having the following average composition $(CH_3)_3SiO—[(CH_3)_2SiO—]_{58}[(CH_3)HSiO—]_6Si(CH_3)_3$, 25.4 g (0.0100 mol) of siloxane having the following average composition $(CH_3)_3SiO—[(CH_3)_2SiO—]_{28}[(CH_3)HSiO—]_5Si(CH_3)_3$, 6.8 g (0.0113 mol) of polyether having the following average composition $CH_2=CH—CH_2O—(C_2H_4O—)_{12}CH_3$, 51.0 g (0.0338 mol) of polyether having the following average composition $CH_2=CH—CH_2O—(C_2H_4O—)_5(C_3H_6O—)_{21}CH_3$, 264.6 g (0.0675 mol) of polyether having the following average composition $CH_2=CH—CH_2O—(C_2H_4O—)_{42}(C_3H_6O—)_{34}COCH_3$, 1.4 g (0.0100 mol) of diallylurea and
265 g of Solvesso 150 are initially taken in a flask provided with a stirrer, a thermometer, a gas inlet and a reflux condenser. Nitrogen is passed through the apparatus, and the flask content is heated to 105° C. while stirring. 0.45 g of a 10% strength solution of $H_2PtCl_6.6H_2O$ in isopropanol is then added to the batch. A slightly exothermic reaction begins. The batch is allowed to react. In the course of the reaction, the batch becomes clear. After 7 hours, the SiH conversion is 98.6% (determined by means of hydrogen elimination with n-butanol in an alkaline medium). A clear, yellow solution of the desired block copolymer in Solvesso 150 is obtained. The block copolymer 6 obtained has the following average composition:

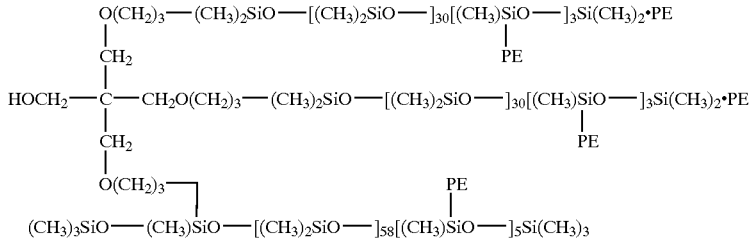

The radical PE comprises 10% of the radical $—(CH_2)_3O—(C_2H_4O—)_{12}CH_3$
and 30% of the radical $—(CH_2)_3O—(C_2H_4O—)_5(C_3H_6O—)_{21}CH_3$
and 60% of the radical $—(CH_2)_3O—(C_2H_4O—)_{45}(C_3H_6O—)_{34}CH_3$.

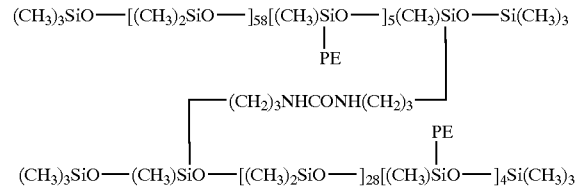

The radical PE comprises 10% of the radical $—(CH_2)_3O—(C_2H_4O—)_{12}CH_3$
and 30% of the radical $—(CH_2)_3O—(C_2H_4O—)_5(C_3H_6O—)_{21}CH_3$
and 60% of the radical $—(CH_2)_3O—(C_2H_4O—)_{42}(C_3H_6O—)_{34}COCH_3$.

Preparation of Block Copolymer 7

Stage a)

86.7 g (0.040 mol) of siloxane having the following average composition

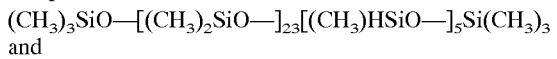
(CH$_3$)$_3$SiO—[(CH$_3$)$_2$SiO—]$_{23}$[(CH$_3$)HSiO—]$_5$Si(CH$_3$)$_3$ and 179.9 g (0.0176 mol)[1)] of polyether having the following average composition

CH$_2$=CH—CH$_2$O—(C$_2$H$_4$O—)$_{15}$(C$_3$H$_6$O—)$_5$CH$_3$

Stage c) [Coupling]

Stage a) is added completely to stage b). After thorough mixing, 8.6 g (0.04 mol) of trimethylolpropane diallyl ether and 22 mg of cis-[PtCl$_2$(NH$_3$)$_2$] are added. After further stirring under a nitrogen atmosphere, an SiH conversion of 97.4% (determined by means of hydrogen elimination with n-butanol in an alkaline medium) is reached after 6 hours. A clear, yellow product is obtained. The Block Copolymer 7 obtained has the following average composition:

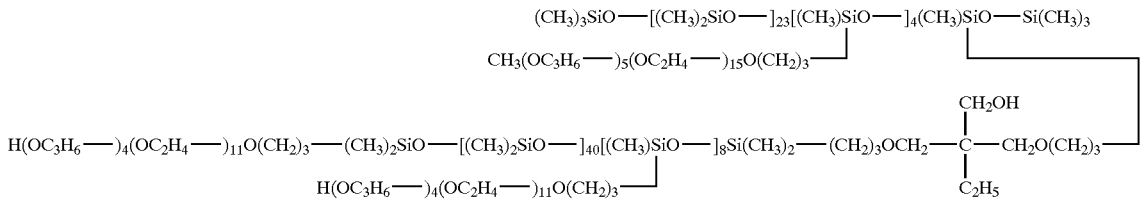

([1)] Although one SiH group per molecule of siloxane used should remain for the subsequent coupling reaction, the reactant is used in a small excess which is compensated by the loss of reactive terminal double bonds due to secondary reaction, rearrangement to give internal double bonds)

are initially taken in a flask provided with a stirrer, a thermometer, a gas inlet and a reflux condenser. Nitrogen is passed through the apparatus, and the flask content is heated to 100° C. with thorough stirring. 8 mg of cis-[PtCl$_2$(NH$_3$)$_2$] are then added to the batch. In the course of the reaction, the batch becomes clear. After 3 hours, the batch has reacted to such an extent that the residual SiH content of the flask content corresponds approximately to that which is established if one SiH group remains per molecule of the siloxane used.

Stage b)

143.3 g (0.040 mol) of siloxane having the following average composition

H(CH$_3$)$_2$SiO—[(CH$_3$)$_2$SiO—]$_{40}$[(CH$_3$)HSiO—]$_8$Si-(CH$_3$)$_2$H and 306.5 g (0.0396 mol)[1)] of polyether having the following average composition

CH$_2$=CH—CH$_2$O—(C$_2$H$_4$O—)$_{11}$(C$_3$H$_6$O—)$_4$H ([1)] cf. note for Block Copolymer 7, stage a))

are initially taken in a further flask provided with a stirrer, a thermometer, a gas inlet and a reflux condenser. Nitrogen is passed through the apparatus, and the flask content is heated to 100° C. with thorough stirring. 14 mg of cis-[PtCl$_2$(NH$_3$)$_2$] are then added to the batch. In the course of the reaction, the batch becomes clear. After 3 hours, the batch has reacted to such an extent that the residual SiH content of the flask content corresponds approximately to that which is established if one SiH group remains per molecule of the siloxane used.

Preparation of Block Copolymer 8

Stage a)

86.7 g (0.040 mol) of siloxane having the following average composition

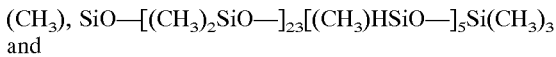
(CH$_3$), SiO—[(CH$_3$)$_2$SiO—]$_{23}$[(CH$_3$)HSiO—]$_5$Si(CH$_3$)$_3$ and 179.9 g (0.0176 mol)[1)] of polyether having the following average composition

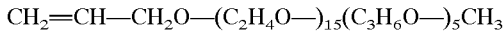
CH$_2$=CH—CH$_2$O—(C$_2$H$_4$O—)$_{15}$(C$_3$H$_6$O—)$_5$CH$_3$ ([1)] cf. note for Block Copolymer 7, stage a))

are initially taken in a flask provided with a stirrer, a thermometer, a gas inlet and a reflux condenser. Nitrogen is passed through the apparatus, and the flask content is heated to 100° C. with thorough stirring. 8 mg of cis-[PtCl$_2$(NH$_3$)$_2$] are then added to the batch. In the course of the reaction, the batch becomes clear. After 3 hours, the batch has reacted to such an extent that the residual SiH content of the flask content corresponds approximately to that which is established if on average one SiH group remains per molecule of the siloxane used.

13.2 g (0.12 mol) of 1,7-octadiene and 9 mg of cis-[PtCl$_2$(NH$_3$)$_2$] are then added to the batch. After further stirring at 100° C., an SiH conversion of 98.9% is reached after 6 hours. The excess 1,7-octadiene is then distilled off at a temperature of 100° C. and a vacuum of about 15 mbar. The intermediate obtained has the following average composition:

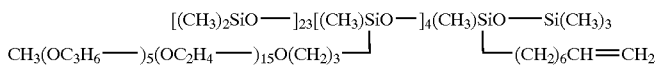

Stage b)

143.3 g (0.040 mol) of siloxane having the following average composition

H(CH$_3$)$_2$SiO—[(CH$_3$)$_2$SiO—]$_{40}$[(CH$_3$)HSiO—]$_8$Si-(CH$_3$)$_2$H and 306.5 g (0.0396 mol)[1)] of polyether having the following average composition

CH$_2$=CH—CH$_2$O—(C$_2$H$_4$O—)$_{11}$(C$_3$H$_6$O—)$_4$H ([1)] cf. note for block copolymer 7, stage a))

are initially taken in a further flask provided with a stirrer, a thermometer, a gas inlet and a reflux condenser and are thoroughly mixed and then stage a) is completely added. Nitrogen is passed through the apparatus, and the flask content is heated to 100° C. with thorough stirring. 22 mg of cis-[PtCl$_2$(NH$_3$)$_2$] are then added to the batch. After 9 hours, the SiH conversion is 97.5% (determined by means of hydrogen elimination with n-butanol in an alkaline medium). A clear, yellow product is obtained. The block copolymer 8 obtained has the following average composition:

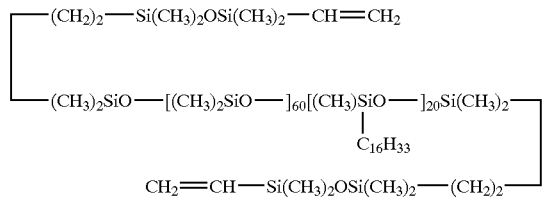

is obtained as an intermediate.

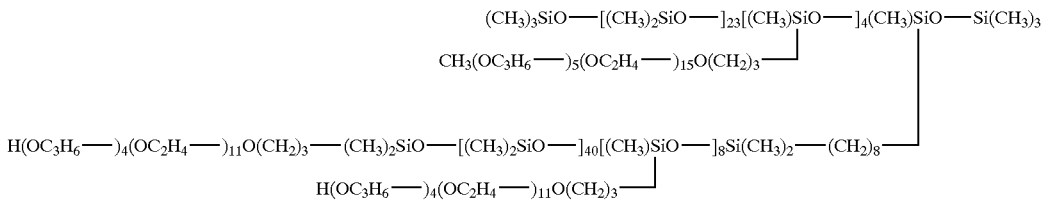

Preparation of Block Copolymer 9

Stage a)

205.5 g (0.02 mol) of siloxane having the following average composition

H(CH$_3$)$_2$SiO—[(CH$_3$)$_2$SiO—]$_{60}$[(CH$_3$)Si(C$_{16}$H$_{33}$)O—]$_{20}$Si(CH$_3$)$_2$H.

(obtainable, for example, by equilibration of a mixture of 1,1,3,3-tetramethyldisiloxane, octamethylcyclotetrasiloxane and cyclic siloxane of the formula [(CH$_3$)(Cl$_{16}$H$_{33}$)SiO—]$_4$ with trifluoromethanesulfonic acid) and 18.6 g (0.10 mol) of 1,3-divinyltetramethyldisiloxane are initially taken in a flask provided with a stirrer, a thermometer, a gas inlet and a reflux condenser. Nitrogen is passed through the apparatus, and the flask content is heated to 100° C. while stirring. 12 mg of Pt$_2$Cl$_4$(C$_6$H$_{10}$)$_2$ are then added to the batch and the mixture is stirred for 4 hours. Thereafter, SiH—bound hydrogen is no longer detectable. The 1,3-divinyltetramethyldisiloxane used in excess is then distilled off in vacuo (about 15 mbar) at 120° C. 0.02 mol of siloxane having the following average composition:

Stage b)

28.0 g (0.040 mol) of siloxane having the following average composition (CH$_3$)$_3$SiO—[CH$_3$)$_2$SiO—]$_4$[(CH$_3$)HSiO—]$_4$Si(CH$_3$)$_3$ and 65.5 g (0.132 mol)[1] of polyether having the following average composition

CH$_2$=CH—CH$_2$O—(C$_2$H$_4$O—)$_6$(C$_3$H$_6$O—)$_3$H ([1] cf. note for Block Copolymer 7, stage a))

are initially taken in a further flask provided with a stirrer, a thermometer, a gas inlet and a reflux condenser. Nitrogen is passed through the apparatus, and the flask content is heated to 100° C. with thorough stirring. 6 mg of cis-[PtCl$_2$(NH$_3$)$_2$] are then added to the batch. In the course of the reaction, the batch becomes clear. After 3 hours, the batch is reacted to such an extent that the residual SiH content of the flask content corresponds approximately to that which is established if on average one SiH group remains per molecule of the siloxane used. The complete stage a) and 306 g of hexyl laurate are then added to stage b), and a further 16 mg of Pt$_2$Cl$_4$(C$_6$H$_{10}$)$_2$ are added after 100° C. has been reached. After 9 hours, the SiH conversion is 96%. A clear, yellow solution is obtained. The solution contains Block Copolymer 9, which has the following average composition:

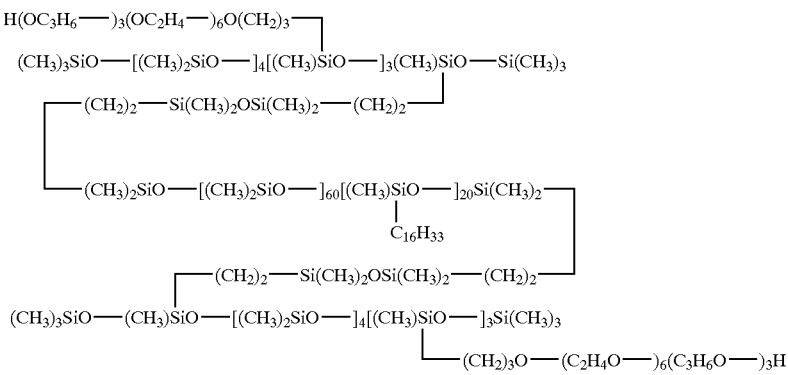

Preparation of Block Copolymer 10

118.7 g (0.02 mol) of siloxane having the following average composition $(CH_3)_3SiO—[(CH_3)_2SiO—]_{60}[(CH_3)HSiO—)_{22}Si-(CH_3)_3$, 22.6 9 (0.02 mol) of siloxane having the following average composition $(CH_3)_3SiO—[(CH_3)_2[SiO—]_9[(CH_3)HSiO—]_5Si(CH_3)_3$, 49.6 g (0.10 mol) of polyether having the following average composition $CH_2=CH—CH_2O—(C_2H_4O—)_6(C_3H_6O)_3H$, 2.2 g (0.02 mol) of 1,7-octadiene and
311 g of hexyl laurate (as solvent)

are initially taken in a flask provided with a stirrer, a thermometer, a gas inlet and a reflux condenser. Nitrogen is passed through the apparatus, and the flask content is heated to 90° C. while stirring. 20 mg of cis-$[PtCl_2(NH_3)_2]$ are then added to the batch. After 10 minutes, the temperature is increased to 115° C. and 117.8 g (0.525 mol) of 1-hexadecene are added dropwise. The temperature should not increase above 120° C. The reaction is then allowed to continue for a further 9 hours. The SiH conversion reaches 97.6%. A clear, yellowish solution is obtained. The solution contains the Block Copolymer 10, which has the following average composition:

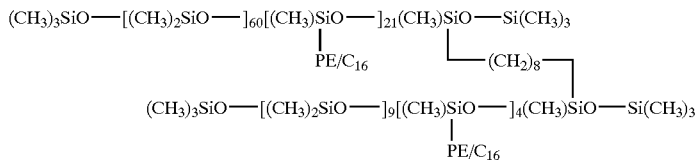

The radical PE/Cl$_{16}$ comprises 16% of the radical
—$(CH_2)_3O$—$(C_2H_4O$—$)_6(C_3H_6O$—$)_3H$
and 84% of the radical —$C_{16}H_{33}$.

Preparation of Block Copolymer 11

Stage a)

70.0 g (0.10 mol) of siloxane having the following average composition $(CH_3)_3SiO—[(CH_3)_2SiO—]_4[(CH_3)HSiO—]_4Si(CH_3)_3$, and 198.0 g (0.33 mol)[1] of polyether having the following average composition $CH_2=CH—CH_2O—(C_2H_4O—)_{12}CH_3$ ([1] cf. note for Block Copolymer 7, stage a))

are initially taken in a flask provided with a stirrer, a thermometer, a gas inlet and a reflux condenser. Nitrogen is passed through the apparatus, and the flask content is heated to 100° C. with thorough stirring. 9 mg of cis-$[PtCl_2(NH_3)_2]$ are then added to the batch. In the course of the reaction, the batch becomes clear. After 3 hours, the batch has reacted to such an extent that the residual SiH content of the flask content corresponds approximately to that which is established if on average one SiH group remains per molecule of siloxane used.

33.0 g (0.3 mol) of 1,7-octadiene and 14 mg of cis-$(PtCl_2(NH_3)_2]$ are then added to the batch. After further stirring at 100° C., an SiH conversion of 99.2% is reached after 6 hours. The excess 1,7-octadiene is then distilled off at a temperature of 100° C. and a vacuum of about 15 mbar. The intermediate obtained has the following average composition:

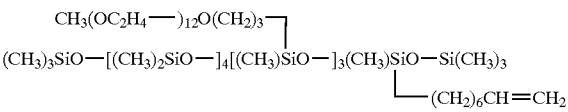

Stage b)

113.0 g (0.10 mol) of siloxane having the following average composition $(CH_3)_3SiO—(CH_3)_2SiO—]_9[(CH_3)HSiO—]_5Si(CH_3)_3$ are initially taken in a further flask provided with a stirrer, a thermometer, a gas inlet and a reflux condenser.

Nitrogen is passed through the apparatus, and the flask content is heated to 100° C. while stirring. 6 mg of cis-$[PtCl_2(NH_3)_2]$ and 1 g of sodium carbonate are then added to the batch, and 50.2 g (0.44 mol)[1] of allyl glycidyl ether ([1] cf. note for Block Copolymer 7, stage a)) are then added dropwise in 20 minutes. After 1 hour, the batch has reacted to such an extent that the residual SiH content of the flask content corresponds approximately to that which is established if on average one SiH group remains per molecule of the siloxane used. Stage a) and 8 mg of cis-$[PtCl_2(NH_3)_2]$ are then added, and the reaction is allowed to continue for a further 7 hours. The SiH conversion reaches 96.9%. Volatile components are distilled off at 120° C. and about 15 mbar. After cooling, the batch is filtered. A clear, yellow product is obtained. The Block Copolymer 11 obtained has the following average composition:

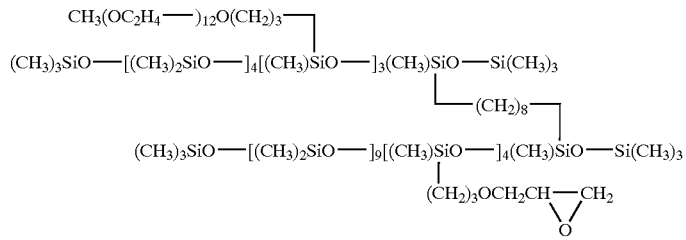

The Block Copolymer 11 has reactive groups and is capable of further chemical reactions; for example, quats and betaines (in this context, cf. for example DE-C-34 17 912) can be prepared therefrom. Betaines are used, for example, in cosmetic formulations.

Preparation of Block Copolymer 12

Stage a)

157.1 g (0.10 mol) of siloxane having the following average composition

H(CH$_3$)$_2$SiO—[(CH$_3$)$_2$SiO—]$_{12}$[(CH$_3$(C$_3$H$_6$Cl)SiO—]$_4$ Si(CH$_3$)$_2$H (obtainable, for example, by equilibration of a mixture of 1,1,3,3-tetramethyldisiloxane, octamethylcyclotetrasiloxane and cyclic siloxane of the formula [(CH$_3$)(C$_3$H$_6$Cl)SiO—]$_4$ with trifluoro-methanesulfonic acid) and 93.2 g (0.50 mol) of 1,3-divinyltetramethyldisiloxane are initially taken in a flask provided with a stirrer, a thermometer, a gas inlet and a reflux condenser. Nitrogen is passed through the apparatus, and the flask content is heated to 100° C. with thorough stirring. 2.3 g of Na$_2$CO$_3$ and 30 mg of Pt$_2$Cl$_4$(C$_6$H$_{10}$)$_2$ are then added to the batch. In the course of the reaction, the batch becomes clear. After 35 minutes, the batch has reacted to such an extent that the residual SiH content of the flask content corresponds approximately to that which is established if on average one SiH group remains per molecule of the siloxane used. The product obtained in stage a) is then added completely to the batch, and stirring is continued at 100° C. After 4.5 hours, the SiH conversion is 97.8% (determined by means of hydrogen elimination with n-butanol in an alkaline medium). After cooling to room temperature, the batch is filtered. A clear, yellow liquid is obtained. The Block Copolymer 12 obtained has the following average composition:

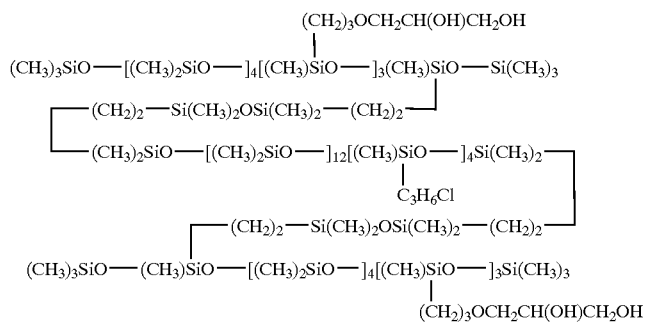

passed through the apparatus, and the flask content is heated to 100° C. while stirring. 18 mg of Pt$_2$Cl$_4$(C$_6$H$_{10}$)$_2$ are then added to the batch and the mixture is stirred for 3.5 hours. Thereafter, SiH-bound hydrogen is no longer detectable. The 1,3-divinyltetramethyldisiloxane used in excess is then distilled off in vacuo (about 15 mbar) at 120° C. 0.1 mol of siloxane having the following average composition:

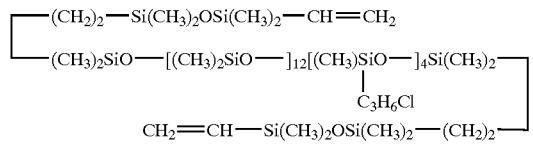

is obtained as an intermediate.

Stage b)

139.9 g (0.20 mol) of siloxane having the following average composition (CH$_3$)$_3$SiO—[(CH$_3$)$_2$SiO—]$_4$[(CH$_3$)HSiO—]$_4$Si(CH$_3$)$_3$ and 87.2 g (0.66 mol)[1)] of 3-allyloxy-1,2-propanediol ([1)] cf. note for Block Copolymer 7, stage a))

Preparation of Block Copolymer 13

Stage a)

171.4 g (0.10 mol) of siloxane having the following average composition

H(CH$_3$)$_2$SiO—[(CH$_3$)$_2$SiO—]$_{12}$[(CH$_3$(C$_8$H$_{17}$)SiO—]$_4$Si(CH$_3$)$_2$H (obtainable, for example, by equilibration of a mixture of 1,1,3, 3-tetramethyldisiloxane, octamethylcyclotetrasiloxane and cyclic siloxane of the formula [(CH$_3$)(C$_8$H$_{17}$)SiO—]$_4$ with trifluoro-methanesulfonic acid) and 55.1 g (0.50 mol) of 1,7-octadiene are initially taken in a flask provided with a stirrer, a thermometer, a gas inlet and a reflux condenser. Nitrogen is passed through the apparatus, and the flask content is heated to 100° C. while stirring. 16 mg of Pt$_2$Cl$_4$ (C$_6$H$_{10}$)$_2$ are then added to the batch and the mixture is stirred for 4 hours. Thereafter, SiH—bound hydrogen is no longer detectable. The 1,7-octadiene used in excess is then distilled off in vacuo (about 15 mbar) at 100° C. 0.1 mol of siloxane having the following average composition:

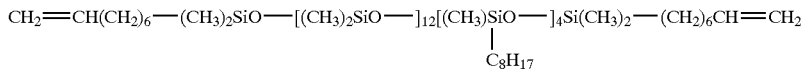

is obtained as an intermediate.

Stage b)

139.9 g (0.20 mol) of siloxane having the following average composition $(CH_3)_3SiO—[(CH_3)_2SiO—]_4[(CH_3)HSiO—]_4Si(CH_3)_3$ and 87.2 g (0.66 mol)[1)] of 3-allyloxy-1,2-propanediol ([1)] cf. note for Block Copolymer 7, stage a))

are initially taken in a further flask provided with a stirrer, a thermometer, a gas inlet and a reflux condenser. Nitrogen is passed through the apparatus, and the flask content is heated to 100° C. with thorough stirring. 2.3 g of $Na_2CO_3$ and 30 mg of $Pt_2Cl_4(C_6H_{10})_2$ are then added to the batch. In the course of the reaction, the batch becomes clear. After 40 minutes, the batch has reacted to such an extent that the residual SiH content of the flask content corresponds approximately to that which is established if on average one SiH group remains per molecule of the siloxane used. The product obtained in stage a) is then added completely to the batch, and stirring is continued at 100° C. After 5.5 hours, the SiH conversion is 97.8% (determined by means of hydrogen elimination with n-butanol in an alkaline medium). After cooling to room temperature, the batch is filtered. A clear, yellow liquid is obtained. The Block Copolymer 13 obtained has the following average composition:

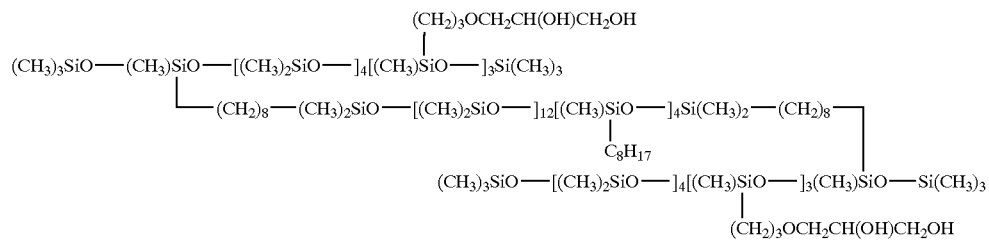

The further, following block copolymers have been prepared by the processes described above.

Block copolymer 14

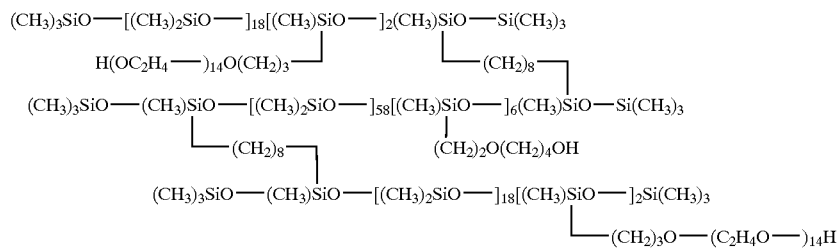

Block copolymer 15

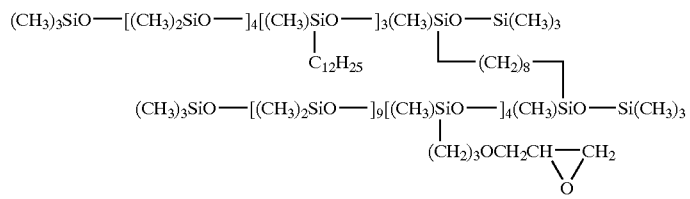

Block copolymer 16

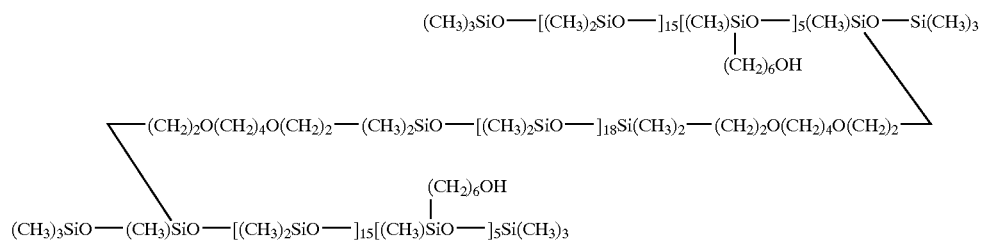

Block copolymer 17
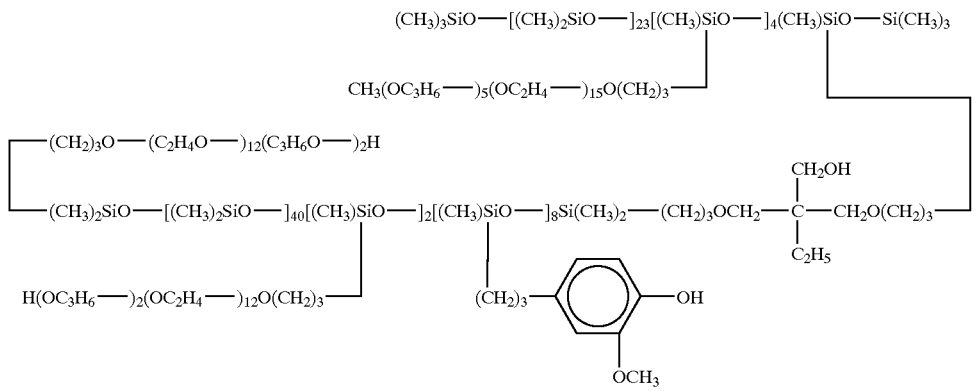
Block copolymer 18
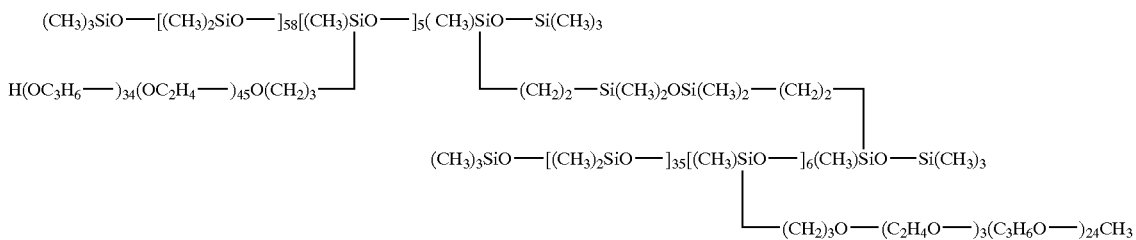
Block copolymer 19
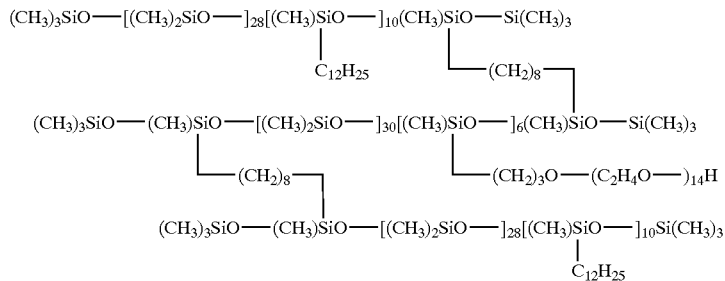
Block copolymer 20
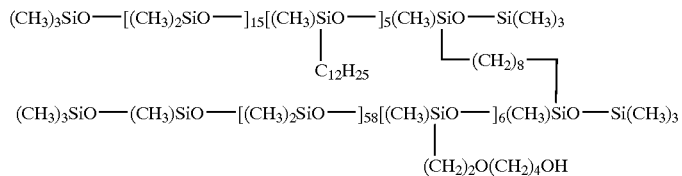
Block copolymer 21
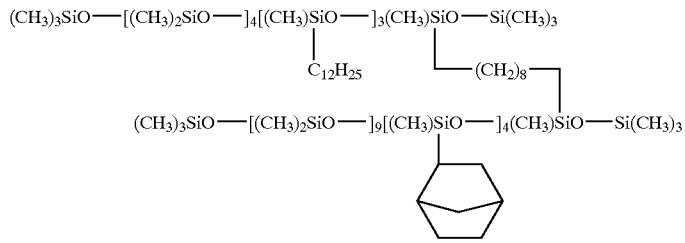

Block copolymer 22

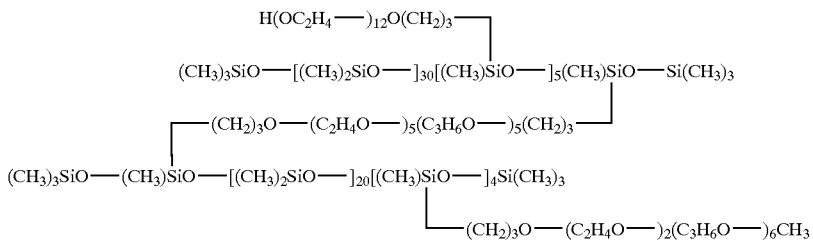

Furthermore, the following block copolymers V 1 to V 5 not according to the invention have been prepared by known methods published in the literature and patents (they serve as comparative substances in the subsequently described investigations of performance characteristics):

The block copolymers 1, 2 and 3 according to the invention and the block copolymers V 1 and V 2 not according to the invention are investigated as additives in the following flexible foam formulation:

Block copolymer V 1:

$$(CH_3)_3SiO-[(CH_3)_2SiO-]_{58}[(CH_3)SiO-]_6Si(CH_3)_3$$
$$|$$
$$Pe$$

| | | |
|---|---|---|
| The radical PE comprises | 10% of the radical | —(CH$_2$)$_3$O—(C$_2$H$_4$O—)$_{12}$CH$_3$ |
| and | 30% of the radical | —(CH$_2$)$_3$O—(C$_2$H$_4$O—)$_5$(C$_3$H$_6$O—)$_{21}$CH$_3$ |
| and | 60% of the radical | —(CH$_2$)$_3$O—(C$_2$H$_4$O—)$_{45}$(C$_3$H$_6$O—)$_{34}$CH$_3$ |

Block copolymer V 2:

$$(CH_3)_3SiO-[(CH_3)_2SiO-]_{120}[(CH_3)SiO-]_{12}Si(CH_3)_3$$
$$|$$
$$Pe$$

| | | |
|---|---|---|
| The radical PE comprise | 10% of the radical | —(CH$_2$)$_3$O—(C$_2$H$_4$O—)$_{12}$CH$_3$ |
| and | 30% of the radical | —(CH$_2$)$_3$O—(C$_2$H$_4$O—)$_5$(C$_3$H$_6$O—)$_{21}$CH$_3$ |
| and | 60% of the radical | —(CH$_2$)$_3$O—(C$_2$H$_4$O—)$_{45}$(C$_3$H$_6$O—)$_{34}$CH$_3$ |

Block copolymer V 3:

$$(CH_3)_3SiO-[(CH_3)_2SiO-]_{12}[(CH_3)SiO-]_4Si(CH_3)_3$$
$$|$$
$$C_3H_6Cl$$

Block copolymer V 4:

$$(CH_3)_3SiO-[(CH_3)_2SiO-]_4[(CH_3)SiO-]_3Si(CH_3)_3$$
$$|$$
$$(CH_2)_3OCH_2CH(OH)CH_2OH$$

Block copolymer V 5:

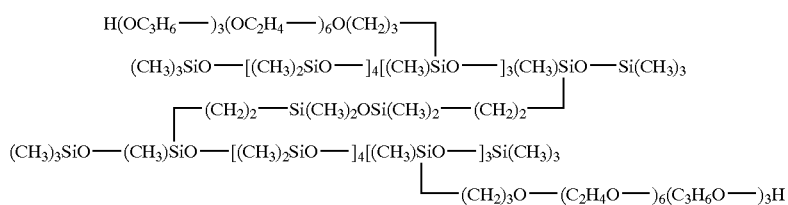

As the Examples show, it is possible by means of the novel structural principle to prepare siloxane block copolymers in which the individual, linked siloxane block copolymers can be made to have different properties. Thus, tailor-made active substances for solving problems in a number of different fields of use can be synthesized. These include, for example, additives for cosmetic formulations, finishes and surface coatings, for textile and paper coating (tissues) and for use as emulsifiers, antifoams, stabilizers in the preparation of polyurethane foams and as reactants if reactive groups are present. The use of the novel siloxane block copolymers in some applications is described below by way of example.

| Flexible foam formulation | |
|---|---|
| | Parts by weight |
| Polyol (OH number: 46, 11% of EO) | 100 |
| Water | 5 |
| Tertiary amine | 0.15 |
| Tin octoate | 0.23 |
| Physical blowing agent | 5 |
| Stabilizer | varied |
| Isocyanate T 80 | 63.04 |

300 g of polyol are used in the foaming. The other formulation components are converted accordingly.

To test the additive as a stabilizer, polyol, water, amine, tin octoate, stabilizer and blowing agent are mixed with thorough stirring. After the addition of the isocyanate, stirring is carried out with d stirrer for 7 seconds at 3000 rpm and the mixture is poured into a paper-lined wooden box (base area 27 cm×27 cm). To test the additive in relation to other properties, for exampleas a cell regulator, it is of course also possible concomitantly to use another stabilizer. A foam is formed, for which the following data are measured to assess the stabilizer used:
1. The settling of the foam at the end of the rise phase (indicated by settling in the table below).
2. The number of cells per centimeter of foam are counted under a microscope.

The results obtained in the foaming are shown in Table 1. The results show that the novel block copolymers can be adapted in an outstanding manner in their desired property profile so that, for example in the case of PU foam applications, stable, fine foams can be obtained. Some of the novel additives are superior to the conventional block copolymers V 1 and V 2. Thus, a particularly advantageous combination of low settling and good fine-cell characteristics is obtained with the use of the block copolymers 1 and 2.

TABLE 1

| Use of copolymer | Parts by weight | Settling [cm] | Cells per cm |
|---|---|---|---|
| 1 | 0.6/0.5 | 0.2/0.4 | 15/14 |
| 2 | 0.6/0.5 | 0.3/0.5 | 15/14 |
| 3 | 0.6/0.5 | 0.7/1.0 | 14/13 |
| V 1 | 0.6/0.5 | 0.5/0.6 | 13/12 |
| V 2 | 0.6/0.5 | 0.3/0.6 | 13/12 |

The block copolymers 11, 12, 13, V 3 and V 4 are tested as paint additives. To test the performance characteristics, the modified silicones are mixed with an air-curing paint system in an amount of 1% by weight and the mixture is applied to bonder steel sheet with a 40 micrometer wire coater. The finish is cured for 2 days at 20° C. and its release behavior is then tested by a peel test with Tesa tape 4154. The tensile force required to draw a test specimen weighing 500 g and resting on three screws over the finish at 30 cm per minute is a measure of the scratch resistance of the finishes obtained. To test the stability of the finish properties, the finish is then rinsed for 10 minutes under running water at 20° C. and the release behavior and the scratch resistance are again measured as described above after drying of the finish. The results are summarized in Table 2.

TABLE 2

| Paint containing 1% by weight of copolymer: | Release [N] | Scratch test [N] | Miscibility | Release after washing [N] | Scratch test after washing [N] |
|---|---|---|---|---|---|
| Paint without addition | 11.6 | 3.2 | | 11.7 | 3.2 |
| V 3 | 3.7 | 0.9 | poor | 9.8 | 3.0 |
| V 4 | 8.2 | 2.7 | good | 8.4 | 2.7 |
| 11 | 5.0 | 1.3 | good to satisfactory | 5.4 | 1.4 |
| 12 | 4.7 | 1.1 | good | 4.9 | 1.3 |
| 13 | 4.4 | 1.1 | good | 4.5 | 1.2 |

It has been found that the substances according to the invention impart both antiscratch properties and abhesive properties to the paint. Owing to the nature of the substituents and the relation of the silicone chain to the number and polarity of the substituents, it is possible to adapt the polarity of the additive and hence also the miscibility in the paint formulation used to the respective polarity of the paint system. The products according to the invention have substantial advantages with regard to the effort to combine abhesive and antiscratch properties as well as good miscibility and durability with one another.

The block copolymers 9 and 10, which are present as a 50% strength by weight solution in hexyl laurate, are used as emulsifiers for the preparation of a W/O emulsion. The block copolymer V 5 not according to the invention serves as a comparison.

| Formulation of the emulsion | | % by weight |
|---|---|---|
| Part a) | Emulsifier | 2.0 |
| | Triglyceryl trioleate | 0.5 |
| | Octamethylcyclotetrasiloxane | 8.5 |
| | Isopropyl myristate | 4.0 |
| | Vaseline DAB 8 | 5.0 |
| Part b) | Water | 78.0 |
| | NaCl | 2.0 |

The emulsions are prepared in a glass container provided with a stirrer. The components a) are introduced into the container and heated gently while stirring. The water, in which the sodium chloride is dissolved, is then added to the mixture of emulsifier and oil. The emulsion obtained is stirred until it reaches room temperature.

Stable, creamy emulsions which still show no signs of breaking of the emulsion even after two weeks are obtained in this manner with the block copolymers 9 and 10. The emulsions can be readily distributed over the skin and have good absorbability. On the other hand, after only one week, the emulsion obtained using the block copolymer V 5 exhibits irregular turbidity at the bottom of the glass container in comparison with the upper part of the emulsion, i.e. initial signs of an incipient phase separation.

What is claimed is:

1. A siloxane block copolymer of the general average formula:

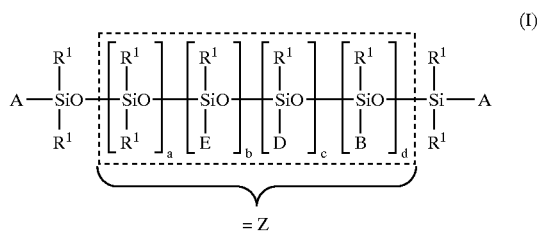

(I)

wherein:

A is independently selected from the group consisting of radical $R^1$, radical E, a radical of the formula IIa $$-X\begin{matrix}R^1\\|\\-SiO-Z-Si-A\\|\\Ye\;R^1\quad R^1\end{matrix} \quad \text{(IIa)}$$

$$=Y^1$$

and a radical of the formula IIb $$\begin{matrix}&R^1&R^1&&R^1\\&|&|&&|\\A-&SiO-&SiO-Z-&Si-A\\&|&|&&|\\Ye&R^1&R^1&&R^1\\-X&&&&\end{matrix} \quad \text{(IIb)}$$

$$=Y^2$$

B is radical of the formula IIa or IIb
Y is the radical $Y^1$ or the radical $Y^2$
where
$Y^1$ is the radical $$\begin{matrix}R^1&&R^1\\|&&|\\-SiO-Z-&Si-A\\|&&|\\R^1&&R^1\end{matrix} \quad \text{(IIa)}$$

and
$Y^2$ is the radical $$\begin{matrix}R^1&R^1&&R^1\\|&|&&|\\A-SiO-&SiO-Z-&Si-A\\|&|&&|\\R^1&R^1&&R^1\end{matrix} \quad \text{(IIb)}$$

D is a radical of the formula $$\begin{matrix}&&R^1\\&&|\\-O-Z-&Si-A\\&&|\\&&R^1\end{matrix}$$

$R^1$ is an alkyl radical having 1 to 30 carbon atoms, a substituted alkyl radical, an optionally substituted aryl radical or an optionally substituted alkaryl radical, where however at least 80% of the radicals $R^1$ are methyl groups,
a has a value from 3 to 200,
b has a value from 0 to 50,
c has a value from 0 to 10,
d has a value from 0 to 5 and
e has a value from 0 to 4,
where the values for a, b, c, d and e in the individual segments Z of the radicals A, B and D may be different,
E is a radical which
a) is a radical of the general formula $$-R_f^2-O-(C_mH_{2m}O-)_nR^3$$

in which
$R^2$ is a divalent alkyl radical which may also be branched and
f has a value of 0 or 1,
m has a value of, on average, from 2 to 4,
n has a value from 0 to 100 and
$R^3$ is a hydrogen radical, an optionally substituted alkyl radical having 1 to 6 carbon atoms, an acyl radical or a —CO—NH—$R^4$ radical in which $R^4$ is an optionally substituted alkyl or aryl radical, and/or
b) has the meaning of an epoxy-functionalized alkyl substituent optionally containing hetero atoms, and/or
c) has the meaning of a mono-, di- and trihydroxyalkyl substituent which may also be aromatic or branched and partially or completely etherified or esterified, and/or
d) has the meaning of a halogen- or pseudohalogen-substituted alkyl, aryl or aralkyl radical which optionally may also be branched,
X is a polyvalent organic radical,
with the proviso that at least one radical of the formula IIa or IIb is present in the molecule and at least two of the segments Z are different in which the linked siloxane copolymer blocks differ by more than 20%
a) in the average number of silicon atoms;
b) in their polarities;
c) in their hydrophilic/hydrophobic balance; or
d) in their proportion of reactive groups,
and where the silicone block copolymer has ≦600 Si atoms.

2. The block copolymer of the general average formula as claimed in claim 1 wherein
X is a bridging radical of the formula $$-R^5-\left[\begin{matrix}CH-(CH_2-)_g\\|\\R^6\end{matrix}\right]_h-R^5-$$

in which
$R^5$ is a divalent alkyl radical which may also be branched and
$R^6$ is a hydrogen radical, an optionally branched alkyl radical or the radical $R^5$ and
g has a value from 0 to 5 and
h has a value from 0 to 4.

3. The block copolymer of the general average formula as claimed in claim 1, wherein
X is a bridging radical of the formula $$\begin{matrix}H&R^6\\R^6&&H\\&&\\H&&R^6\\R^6&&H\\&&\\H&R^6\\R^6&H\end{matrix}$$

in which $R^6$ is a hydrogen radical, an optionally branched alkyl radical, or an optionally branched divalent alkyl radical.

4. The block copolymer of the general average formula as claimed in claim 1, wherein X is a bridging radical of the formula

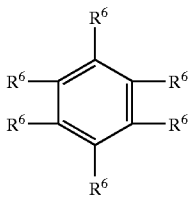

in which $R^6$ is a hydrogen radical, an optionally branched alkyl radical, or an optionally branched divalent alkyl radical.

5. The block copolymer of the general average formula as claimed in claim 1, wherein X is a bridging radical of the formula —$R^5$—O—($C_{m'}H_{2m'}$O—)$_{n'}R^5$— in which $R^5$ is an optionally branched divalent alkyl radical, m' has a value of, on average, from 2 to 4 and n' has a value from 0 to 20.

6. The block copolymer of the general average formula as claimed in claim 1, wherein X is a bridging radical of the formula —$R^5$—(CO—)$_k$OCH$_2$—(CR$_2^7$—)$_i$CH$_2$O—(CO—)$_k$R$^5$— in which $R^5$ is an optionally branched divalent alkyl radical and $R^7$ is a hydrogen radical, an alkyl radical, a hydroxyalkyl radical or the radical —CH$_2$O—(CO)$_k$R$^5$— and i has a value from 0 to 10 and k has a value of 0 or 1, or of the formula

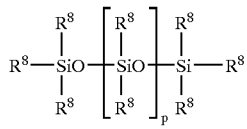

in which $R^8$ is an alkyl radical, a substituted alkyl radical, a phenyl radical or the radical $R^5$ and p has a value from 0 to 10 and if it has the meaning of an alkyl radical, the radical $R^8$ is an alkyl radical of 1 to 6 carbon atoms.

7. The block copolymer of the general average formula as claimed in claim 1, wherein X is a bridging radical of the formula

—$R^5$—NH—CO—NH—$R^5$— in which $R^5$ is an optionally branched divalent alkyl radical.

8. The block copolymer according to claim 1, whose average composition is

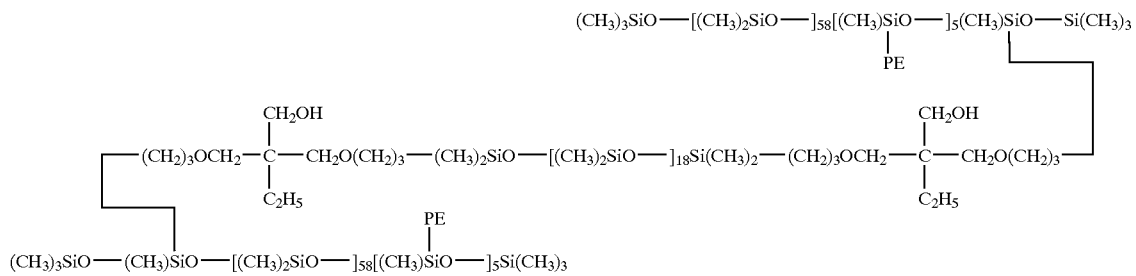

where
radical PE comprises 10% of the radical —(CH$_2$)$_3$O—C$_2$H$_4$O—)$_{12}$CH$_3$
and 30% of the radical —(CH$_2$)$_3$O—C$_2$H$_4$O—)$_5$(C$_3$H$_6$O—)$_{21}$CH$_3$
and 60% of the radical —(CH$_2$)$_3$O—C$_2$H$_4$O—)$_{45}$(C$_3$H$_6$O—)$_{34}$CH$_3$;

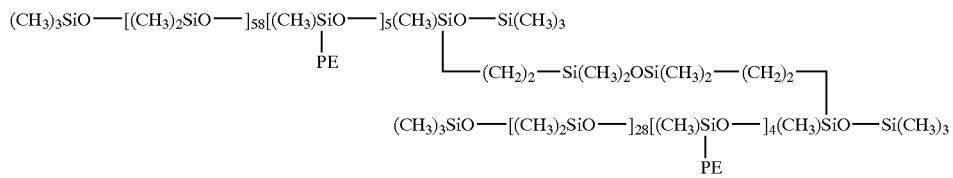

where
the radical PE comprises 10% of the radical —(CH$_2$)$_3$O—C$_2$H$_4$O—)$_{12}$CH$_3$
and 30% of the radical —(CH$_2$)$_3$O—C$_2$H$_4$O—)$_5$(C$_3$H$_6$O—)$_{21}$CH$_3$
and 60% of the radical —(CH$_2$)$_3$O—C$_2$H$_4$O—)$_{45}$(C$_3$H$_6$O—)$_{34}$CH$_3$; or

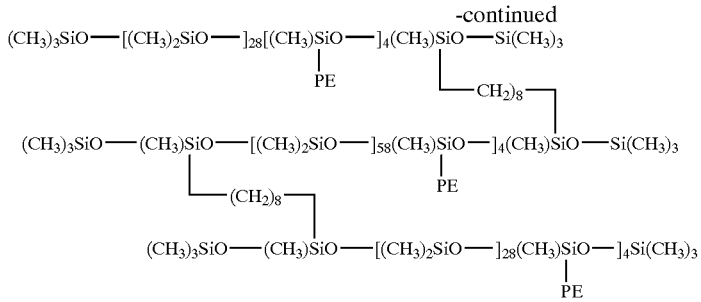

where
the radical PE comprises 10% of the radical —(CH$_2$)$_3$O—C$_2$H$_4$O—)$_{16}$(C$_3$H$_6$O—)$_{12}$CH$_3$
and 55% of the radical —(CH$_2$)$_3$O—C$_2$H$_4$O—)$_5$(C$_3$H$_6$O—)$_{21}$CH$_3$
and 10% of the radical —(CH$_2$)$_3$O—C$_2$H$_4$O—)$_{45}$(C$_3$H$_6$O—)$_{34}$CH$_3$
and 25% of the radical —(CH$_2$)$_3$O—C$_2$H$_4$O—)$_{45}$(C$_3$H$_6$O—)$_{34}$H.

9. A block copolymer according to claim 1, whose average composition is

10. A method for reducing the surface tension of a liquid or the interfacial tension between two liquids which comprise adding a siloxane block copolymer according to claim 1 to said liquid or liquids.

11. The block copolymer according to claim 1, wherein the linked siloxane copolymer blocks differ by more then 20% in the average number of silicon atoms.

12. In a method for preparing a polyurethane foam, the improvement which comprises adding a block copolymer of the general average formula

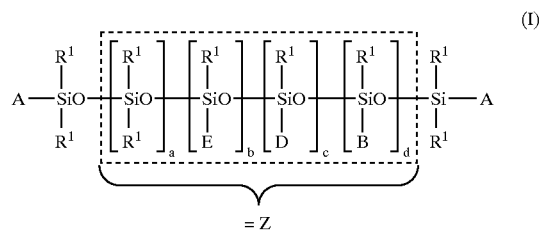

wherein A is independentely selected from the group consisting of radical $R^1$, radical E, a radical of the formula IIa

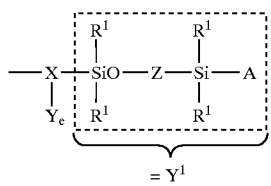

(IIa)

and a radical of the formula IIb

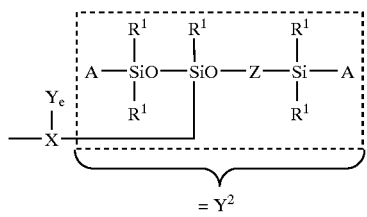

(IIb)

B is radical of the formula IIa or IIb
Y is the radical $Y^1$ or the radical $Y^2$
where
$Y^1$ is the radical

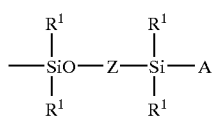

(IIa)

and
$Y^2$ is the radical

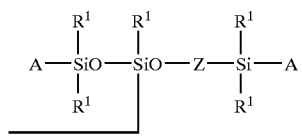

D is a radical of the formula

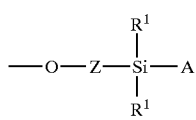

$R^1$ is an alkyl radical having 1 to 30 carbon atoms, a substituted alkyl radical, an optionally substituted aryl radical or an optionally substituted alkaryl radical, where however at least 80% of the radicals $R^1$ are methyl groups,
a has a value from 3 to 200,
b has a value from 0 to 50,
c has a value from 0 to 10,
d has a value from 0 to 5 and
e has a value from 0 to 4,
where the values for a, b, c, d and e in the individual segments Z of the radicals A, B and D may be different, E is a radical which
a) is a radical of the general formula

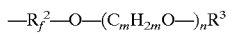

in which
$R^2$ is a divalent alkyl radical which may also be branched and
f has a value of 0 or 1,
m has a value of, on average, from 2 to 4,
n has a value from 0 to 100 and
$R^3$ is a hydrogen radical, an optionally substituted alkyl radical having 1 to 6 carbon atoms, an acyl radical or a —O—CO—NH—$R^4$ radical in which $R^4$ is an optionally substituted alkyl or aryl radical, and/or
b) has the meaning of an epoxy-functionalized alkyl substituent optionally containing hetero atoms, and/or
c) has the meaning of a mono-, di- and trihydroxyalkyl substituent which may also be aromatic or branched and partially or completely etherified or esterified, and/or
d) has the meaning of a halogen- or pseudohalogen-substituted alkyl, aryl or aralkyl radical which optionally may also be branched,
X is a polyvalent organic radical,
with the proviso that at least one radical of the formula IIa or IIb is present in the molecule and at least two of the segments Z are different and where the silicone block copolymer has ≦600 Si atoms.

13. The method according to claim 12 where in the block copolymer
X is a bridging radical of the formula

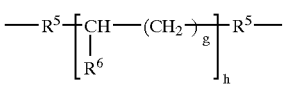

in which
$R^5$ is a divalent alkyl radical which may also be branched and
$R^6$ is a hydrogen radical, an optionally branched alkyl radical or the radical $R^5$ and
g has a value from 0 to 5 and
h has a value from 0 to 4.

14. The method according to claim 12, where in the block copolymer
X is a bridging radical of the formula

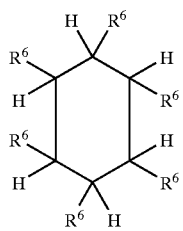

in which $R^6$ is a hydrogen radical, an optionally branched alkyl radical, or an optionally branched divalent alkyl radical.

15. The method according to claim 12, where in the block copolymer
X is a bridging radical of the formula $$-R^5-O-(C_{m'}H_{2m'}O-)_{n'}R^5-$$

in which $R^6$ is a hydrogen radical, an optionally branched alkyl radical, or an optionally branched divalent alkyl radical.

16. The method according to claim 12, where in the block copolymer

X is a bridging radical of the formula

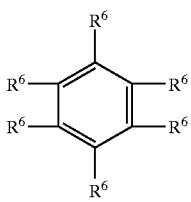

in which $R^5$ is an optionally branched divalent alkyl radical, m' has a value of, on average, from 2 to 4 and n' has a value from 0 to 20.

17. The method according to claim 12, where in the block copolymer

X is a bridging radical of the formula $$-R^5-(CO-)_kOCH_2-(CR_2^7-)_iCH_2O-(CO-)_kR^5-$$

in which $R^5$ is an optionally branched divalent alkyl radical and $R^7$ is a hydrogen radical, an alkyl radical, a hydroxyalkyl radical or the radical $-CH_2O-(CO)_kR^5-$ and i has a value from 0 to 10 and k has a value of 0 or 1, or of the formula

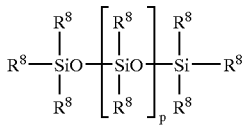

in which $R^8$ is an alkyl radical, a substituted alkyl radical, a phenyl radical or the radical $R^5$ and p has a value from 0 to 10 and if it has the meaning of an alkyl radical, the radical $R^8$ is an alkyl radical of 1 to 6 carbon atoms.

18. The method according to claim 12, where in the block copolymer

X is a bridging radical of the formula $$-R^5-NH-CO-NH-R^5-$$

in which $R^5$ is an optionally branched divalent alkyl radical.

19. The method according to claim 12, where the average composition of the block copolymer is

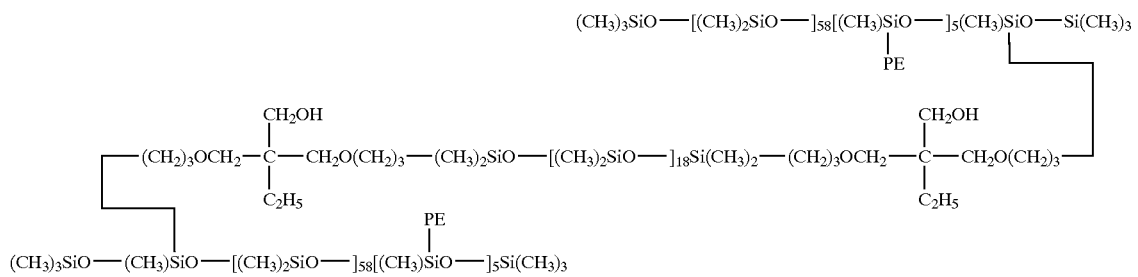

where
radical PE comprises 10% of the radical $-(CH_2)_3O-C_2H_4O-)_{12}CH_3$
and 30% of the radical $-(CH_2)_3O-C_2H_4O-)_5(C_3H_6O-)_{21}CH_3$
and 60% of the radical $-(CH_2)_3O-C_2H_4O-)_{45}(C_3H_6O-)_{34}CH_3$;

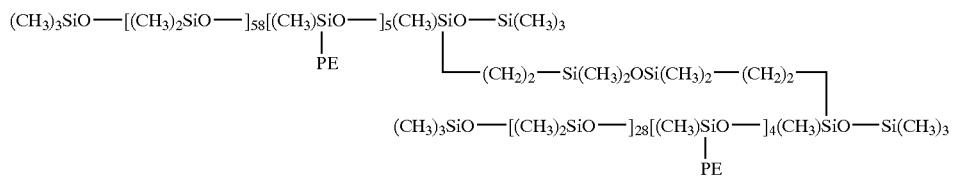

where
the radical PE comprises 10% of the radical $-(CH_2)_3O-C_2H_4O-)_{12}CH_3$
and 30% of the radical $-(CH_2)_3O-C_2H_4O-)_5(C_3H_6O-)_{21}CH_3$
and 60% of the radical $-(CH_2)_3O-C_2H_4O-)_{45}(C_3H_6O-)_{34}CH_3$; or

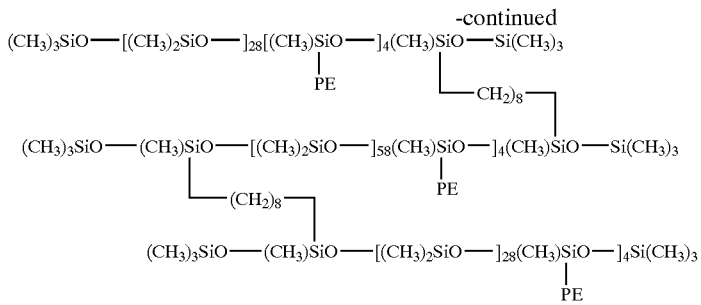
where
the radical PE comprises 10% of the radical   —(CH$_2$)$_3$O—C$_2$H$_4$O—)$_{16}$(C$_3$H$_6$O—)$_{12}$CH$_3$
and                      55% of the radical   —(CH$_2$)$_3$O—C$_2$H$_4$O—)$_5$(C$_3$H$_6$O—)$_{21}$CH$_3$
and                      10% of the radical   —(CH$_2$)$_3$O—C$_2$H$_4$O—)$_{45}$(C$_3$H$_6$O—)$_{34}$CH$_3$
and                      25% of the radical   —(CH$_2$)$_3$O—C$_2$H$_4$O—)$_{45}$(C$_3$H$_6$O—)$_{34}$H.
20. The method according to claim 12, where the average composition of the block copolymer is
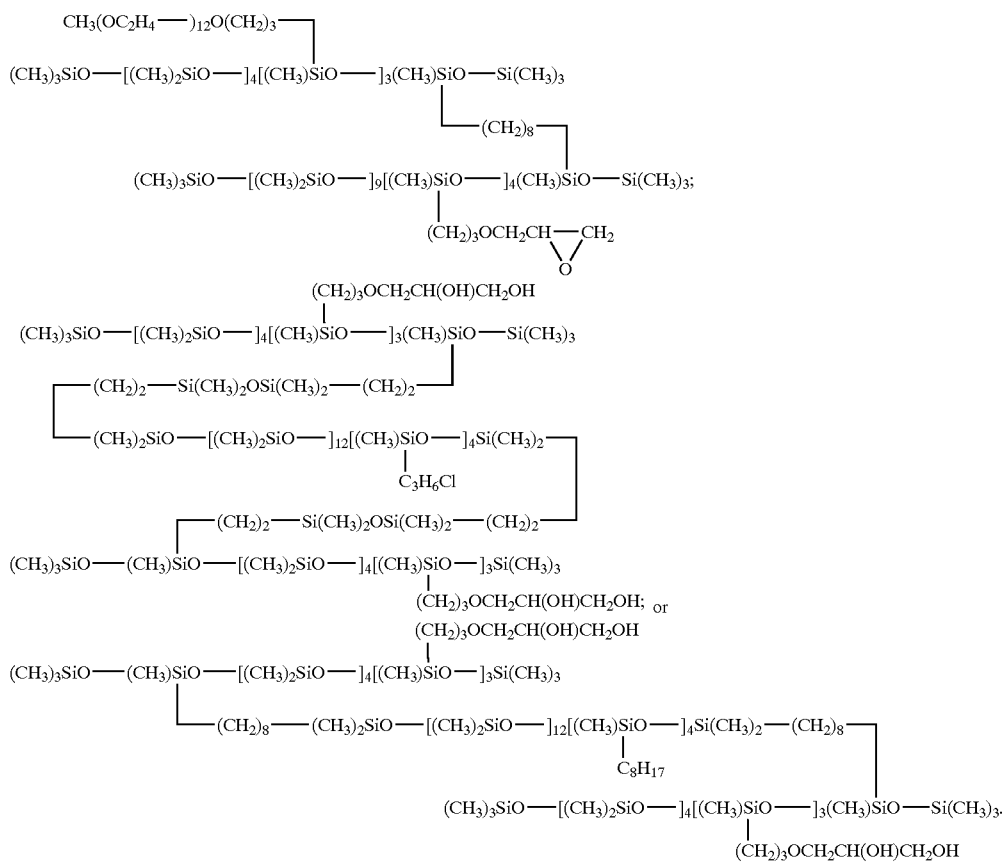
\* \* \* \* \*